United States Patent [19]

Blanchard et al.

[11] Patent Number: 4,646,133

[45] Date of Patent: Feb. 24, 1987

[54] ADAPTIVE COMB FILTER AND INTERPOLATOR

[75] Inventors: David L. Blanchard, Lake Zurich; Paul A. Snopko, Chicago, both of Ill.

[73] Assignee: Zenith Electronics Corporation, Glenview, Ill.

[21] Appl. No.: 683,437

[22] Filed: Dec. 18, 1984

[51] Int. Cl.$^4$ .......................... H04N 9/78; H04N 9/64
[52] U.S. Cl. ......................................... 358/11; 358/31
[58] Field of Search ................................... 358/11, 31

[56] References Cited

U.S. PATENT DOCUMENTS

| | | | |
|---|---|---|---|
| 4,050,084 | 9/1977 | Rossi | 358/31 |
| 4,218,700 | 8/1980 | Kashigi | 358/31 |
| 4,322,750 | 3/1982 | Lord et al. | 358/140 |
| 4,355,333 | 10/1982 | Sato | 358/160 |
| 4,400,719 | 8/1983 | Powers | 358/21 |
| 4,415,931 | 11/1983 | Dischert | 358/140 X |
| 4,470,069 | 9/1984 | Lewis, Jr. et al. | 358/31 |
| 4,530,004 | 7/1985 | Achiha et al. | 358/11 |
| 4,550,336 | 10/1985 | Sepp | 358/11 |
| 4,558,347 | 12/1985 | Pritchard et al. | 358/11 |
| 4,567,508 | 1/1986 | Hulyer | 358/11 |
| 4,573,068 | 2/1986 | Dorsey et al. | 358/11 |

FOREIGN PATENT DOCUMENTS 57-4662 1/1982 Japan .

OTHER PUBLICATIONS

Cohen, "Digital Processing Hikes Resolution to Sharpen TV Image", Electronics, Sep. 8, 1983.

Deubert, "Feature IC's for Digivision TV Sets", 1983 IEEE publication.

Rossi, "Digital TV Comb Filter with Adaptive Features", CBS Technology Center, 1976.

Primary Examiner—John W. Shepperd

[57] ABSTRACT

An adaptive comb filter and interpolator is combined with scan conversion circuitry thereby to reduce requirements for memory storage. Scan rate conversion processing of received television signals is coupled with adaptive comb filtering and interpolating to allow for all of the separate processes to be accomplished utilizing combined circuitry and a single memory using less memory storage space than the sum of the memory that the separate functions would normally require when performed at separate or discrete portions of a television receiver circuitry. A predetermined number of lines are stored in a memory and written out to combing and interpolating arithmetic logic circuitry under the control of a separate control circuit. The control circuit addresses the memory to provide for separately reading in the received digitalized video information and writing out the scan converted information to the logic circuitry for combing and interpolating. The scan rate converted, combed and interpolated chroma and luma signals are provided to the video display circuitry. The control circuit is governed by the synchronizing information of the received signal in addition to a pixel timing clock and mode control information. Two to one scan conversion for progressive scan line display is provided.

19 Claims, 7 Drawing Figures

ADAPTIVE COMB FILTER AND INTERPOLATOR

BACKGROUND OF THE INVENTION

The present invention relates generally to the television arts and particularly to providing an improved television picture display. More particularly, the present invention provides for adaptive comb filtering, scan rate conversion, and interpolation of video display lines using common circuitry to facilitate improvement in the displayed picture with a reduction in the circuit requirements within the television receiver.

Comb filtering has frequently been used to increase usable video bandwidth in consumer receivers. In a basic, two scan line, one horizontal delay comb, separation of chroma (chrominance) and luma (luminance) is obtained by adding and subtracting adjacent horizontal lines within a field. This is possible because the chroma information in adjacent lines will be opposite in phase. However, the basic, two scan line comb filter creates comb errors which mix chroma with luma (cross color and cross luma) in the displayed picture to create picture edge artifacts.

One refinement in the art provides for a three scan line, two horizontal line delay comb filter which reduces the chroma noise factor by 50 percent. In such a comb, video from the first scan line and the third scan line is averaged before taking the sum and difference with the second scan line for chroma/luma separation. Consequently, comb errors on vertical edges may be more nearly eliminated through the balancing of the uncorrelated chroma between the first and third lines.

A further refinement on this concept is illustrated in an adaptive comb filter described in a paper entitled "Digital TV Comb Filter with Adaptive Features," by John Rossi. Generally, such a comb uses a third horizontal line of video delay which allows for the three scan line, two horizontal line delay comb-filtering and for the generation of three line chroma correlation signals. In this system, the magnitudes of chroma for each of the first, second, and third lines is detected and compared with that of the others. The adaptive comb then selects the best combed or non-combed result for display. This selection is based upon a predetermined algorithm which uses a fixed threshold comparison to determine whether correlation exists between the chroma magnitude of adjacent lines. A priority logic table then selects the most desirable of the available outputs. If a non-combed output is indicated, the logic tests the adjacent chroma magnitude within a line to determine whether any chroma should be displayed during that point in the picture.

The result of the refinements in the comb filtering art have been to provide an improved video display. As indicated, this is typically accomplished using a comb filter which requires three lines of memory storage in order that three separate lines of the video display may be compared, added and subtracted or otherwise subjected to algorithmic processing.

A television receiver/monitor can be constructed to be compatible with two line-scanning standard techniques commonly referred to as non-interlaced and interlaced scan. The non-interlaced received signal comprises a 262 line frame every sixtieth of a second with each line scanned progressively onto the picture tube. The interlaced transmitted signal comprises a full 525 line frame every thirtieth of a second. This 525 line frame is broken into two fields, each having two hundred sixty two and one half lines, one containing the odd lines and the other containing the even lines. These two fields are transmitted in succession and the television raster first scans the odd lines onto the picture tube and then in the succeeding field returns and scans the even lines between the odd lines. Thus, interlacing seeks to define the display in greater detail.

Another method for providing greater definition in the display uses scan rate conversion. In this method, the information and scan rates are altered to produce at least two horizontal lines for display within the time one horizontal line is received. The first of these two lines displayed is a replica of the horizontal line received. The second line is interpolated or averaged together with the next succeeding received line to create an interstitial line that is displayed between the two lines which were originally received adjacent to each other. Thus, scan rate conversion processing creates an increase in the number of lines available for display by estimating the picture content between two successive received horizontal lines.

Scan rate conversion is applicable to both interlaced and non-interlaced line-scanning techniques. The use of scan rate conversion with the non-interlaced line scan technique increases the number of lines displayed by transforming a progressive line scan of 262 lines per frame occurring every sixtieth of a second into a progressive line scan of 524 lines per frame occurring every sixtieth of a second.

Scan rate conversion may be used with the interlaced line scan technique to either reduce the picture artifacts created by interlace or to increase the number of lines displayed in each frame. The interlace process divides the 525-line frame into two successive $262\frac{1}{2}$ line fields termed odd (lines 1, 3, 5, . . . ) and even (lines 2, 4, 6, . . . ). In effect, the raster scanned by either field alone may be considered to create a white or colored image interleaved with the lines from the previous field. Interlacing produces a 525 line frame image at 30 frames per second by combining two $262\frac{1}{2}$ line fields at 60 fields per second. Interlacing also creates the subjective illusion or artifact of an apparent vertical drift of the two fields and creates a visible flicker of large white or colored areas at the field rate. Edge flicker is also observed at abrupt edges in which the brightness transition of an object occurs between adjacent lines of the successive fields. Scan rate conversion processing can be used to eliminate large area flicker and to reduce edge flicker by producing an interstitial horizontal line in one field which is an estimate of the actual horizontal line occurring in the next successive field. Thus, a pseudo 525 line frame progressive scan display which occurs every sixtieth of a second is created from the original 525 line frame interlaced scan display that is received every thirtieth of a second.

Alternatively, the scan rate conversion may be used to transform a received signal comprising a 525 line frame every thirtieth of a second to display a 1050 line frame every thirtieth of a second. This transformation requires that a received horizontal line be scan rate converted into two horizontal lines such that both the replicated and the interpolated lines of one field are interleaved with the replicated and interpolated lines of the successive field. A simple technique that interleaves the scan rate converted fields would force the start of the vertical deflection of the display tube to occur after $262\frac{3}{4}$ lines have been scanned for the odd field and to occur after $262\frac{1}{4}$ lines have been scanned for the even field. This method introduces picture artifacts on diagonal lines, in addition to the large area and edge flicker artifacts inherent in the interlaced scan technique. The diagonal artifacts are created by the incorrect sequence of replicated and interpolated lines of one field with respect to the replicated and interpolated lines of the next successive field. FIG. 1 illustrates this phenomenon with the replicated lines denoted RO or RE and the interpolated lines denoted IO or IE with "O" and "E" referring to the odd and even fields. The line sequence displayed for a 1050 line frame (FIG. 1) is either RO,-RE,IO,IE,RE,RO,IE,IO or RE,RO,IE,IO,RE,-RO,IE,IO. In order to minimize the diagonal artifacts introduced, the 1050 line frame display sequence should be RO,IO,RE,IE,RO,IO,RE,IE. A method that obtains the correct sequence requires that a vertical displacement on alternate horizontal lines be inserted into the display to force the interpolated lines to become paired with the replicated lines of the same field. This technique is known in the art and is also described in Japanese Pat. No. 57-4622.

The basic scan rate conversion and interpolation system described above typically uses a three line memory. One line is used to store the video signal of the current-received horizontal line while the remaining two memory lines contain the signals for the two previous most-recently received horizontal lines. During the time the current-received line is stored, the video signal that was stored during the second preceding horizontal line time is read once for display unaltered, and then read again together with the line stored one horizontal line time earlier. These two signals are then averaged to form the interpolated line displayed. This sequence of events is repeated to create an interstitial line which is displayed between the two lines which were originally adjacent to each other.

Although the adaptive comb filter and the scan converter with interpolation features may typically be employed in any particular television receiver, each will also typically require at least three lines of memory storage and the memory support circuitry to accomplish the respective features of the individual circuits. Correspondingly, each of these circuits will require the space within the television receiver and on the circuit boards therein to accommodate the necessary memory storage and the memory support circuitry for each function. Such a system is illustrated in, "Digital Processing Filter Resolution to Sharpen TV Image," Electronics, pp. 77–78, Sept. 8, 1983.

However, in the television art, space within the television receiver is at a premium and may in fact be defined in terms of cost per square inch of circuit board along with the circuit cost incurred for adding each additional feature. Accordingly, it is desirable to reduce both the space requirement and any circuit redundancy within the television receiver. Thus, it is desirable to use the memory storage within the receiver to the greatest extent possible to minimize both the space and the circuitry costs associated with the additional features. Therefore, it is desirable to provide a combined adaptive comb filter and a scan rate converter having interpolation which utilizes a single memory for performing the function of each circuit without requiring the amount of memory and memory support circuitry which would be required if each function were performed independently. Accordingly, it is a primary object of the present invention to provide circuitry to overcome the general deficiencies of the prior art.

It is a primary object of the present invention to provide an adaptive comb filter and scan rate converter having an interpolator.

It is a further object of the present invention to combine the memory storage used for the adaptive comb filter and scan rate converter.

It is a further object of the present invention to provide an adaptive comb filter and scan rate converter having an interpolator that eliminates redundant circuitry.

BRIEF DESCRIPTION OF THE FIGURES

The features of the present invention which are believed to be novel are set forth with particularity in the appended claims. The invention, together with the objects and advantages thereof, may best be understood by reference to the claims in conjunction with the following description and the accompanying drawings of which:

DESCRIPTION OF THE PREFERRED EMBODIMENT

The present invention generally provides means for improving the displayed picture quality of a television receiver. More particularly, the present invention provides a means for adaptive comb filtering, scan rate converting, and interpolating received signals to provide increased picture quality associated with the separate functions while using a single memory having less storage space than would be needed if the functions were performed separately.

The preferred embodiment of the present invention utilizes an N line memory 30 to receive digitized video input and provides scan rate converted signals to a comb and interpolator arithmetic logic circuit 32 to perform the combing and interpolating for outputting digitized video for reconversion to an analog signal and ultimately for display on the picture tube. Both memory 30 and comb and interpolator arithmetic logic circuit 32 are controlled by a control and address sequencer circuit 34.

Control circuit 34 is responsive to the video synchronizing signals of the received television signal and to timing signals to control the rate at which information is written into and read out of memory 30. Control circuit 34 is further utilized to select the appropriate operational mode for logic circuit 32. In this fashion, received video signals are scan rate converted, combed to separate chroma and luma, and further interpolated to provide interstitial lines between normally adjacent lines of the display field. A single memory 30 is used which contains N lines of storage with N being less than the sum of the memory storage requirements for scan rate converting, combing and interpolating when performed at separate and discrete points in television receiver circuitry. The final result is a video signal for display on the picture tube raster with reduced comb artifacts and less line structure visibility.

Figure 1:
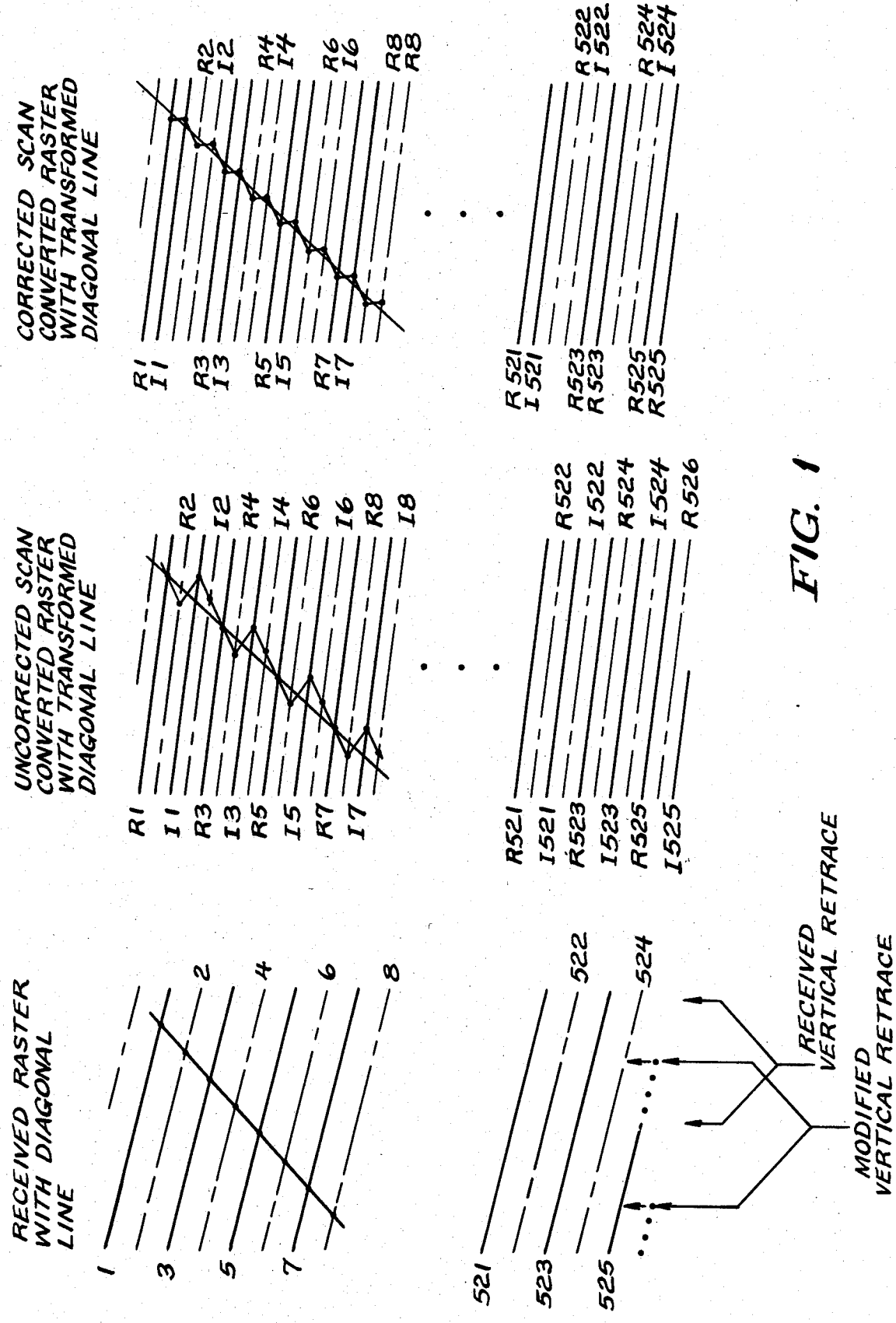
FIG. 1 represents a scanned image of a diagonal line displayed on a conventional interlaced 525 line raster, a 2:1 scan converted interlaced 1050 line interlaced raster created by a modified vertical sync delay, and a 2:1 scan converted 1050 line interlaced raster created by a vertical displacement on alternate horizontal lines.
Figure 2:
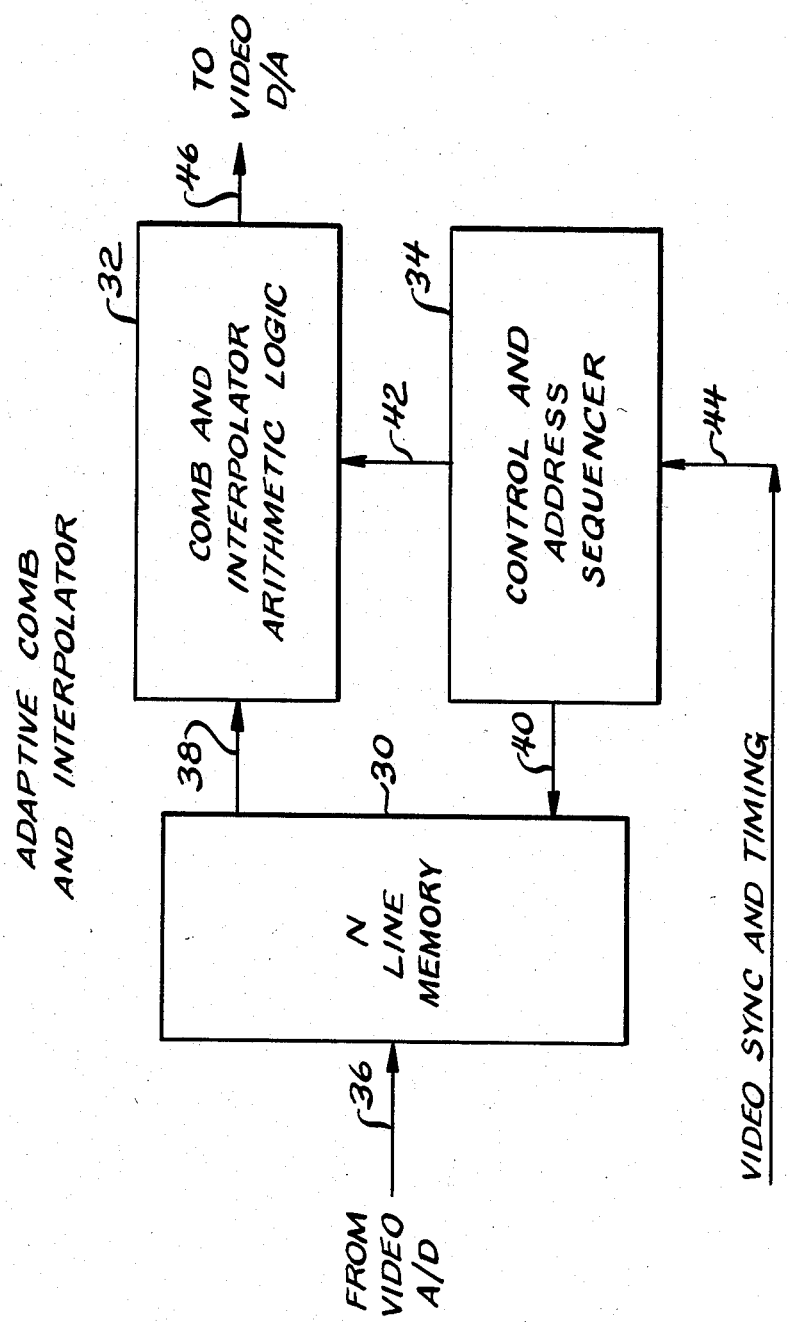
FIG. 2 is a representational block diagram of a combined adaptive comb and interpolator according to the present invention.

Thus, in FIG. 2, a block diagram which generally illustrates a preferred embodiment of the present invention, a memory 30 is shown in cooperating connection with a logic circuit 32 and a control circuit 34. More particularly, digitized video is received on data bus 36 and stored at the rate at which it is received at memory 30. Typically, the digitized video on bus 36 will be at a 15 kHz line rate. Logic circuit 32 receives information from memory 30 via a data bus 38. Control circuit 34 is cooperatively connected to memory 30 by address/control bus 40 and to logic circuit 32 by control bus 42. In operation, control circuit 34 controls the address sequencing for memory 30. Control circuit 34 also receives an input comprising video sync information from the transmitted television signal with pixel timing information on control bus 44. Utilizing this information, control circuit 34 may control the addressing of memory 30 to allow the video information received on bus 36 to be written into the memory 30 as it is received, that is, at the rate at which it was originally transmitted.

However, because control circuit 34 may also derive an increased accessing rate signal, it may control the reading and writing address sequencing of memory 30 to allow information to be read from memory 30 at a rate greater than the rate at which the information was originally received, for example, two or four times that of the originally received rate. In this fashion, the information recieved by logic circuit 32 via bus 38 will typically be "scan rate converted" which will allow combing and interpolation and subsequent retransmission via bus 46 of chroma and luma information for digital to analog conversion and ultimate display on the picture tube. The information retransmitted on bus 46 will be at a rate greater than that at which the information was received at bus 36. Typically this will be at a 31 kHz line rate for progressive or interlace line scan at twice the normal horizontal rate to reduce flicker or reduce scan line visibility through the introduction of interstitial lines between normally adjacent display lines.

Memory 30 is identified as having N lines of storage. In the adaptive comb and interpolator of the present invention, N lines represents the minimum number of lines which may be stored to allow for the successful execution of the scan rate converting, combing and interpolating processes. When it is desired that the input transmission rate be scan converted to twice the received rate, N will typically be about $3\frac{1}{2}$ so that memory 30 will store $3\frac{1}{2}$ lines of the received television signal information. This will allow a $262\frac{1}{2}$ line progressive scan field to be converted to a 525 line progressive scan field through the scan converting process. This will also allow, through proportioning and combining of adjacent lines within a field, the display of a 1050 line interlaced display or a 525 line progressive scan display. If it is desired to double the rate conversion again so that the $262\frac{1}{2}$ line interlaced field is converted to a 1,050 progressive scan line field, N may be at least $4\frac{1}{4}$, so that $4\frac{1}{4}$ lines of received television signal information can be stored at any one time in the memory 30. It is possible that other considerations such as accessing time may influence the decision as to the number of lines which should be stored in either of these applications, for example, $3\frac{3}{4}$ lines may be desired to be stored during the scan rate conversion from $262\frac{1}{2}$ to 525. However, the description herein is directed toward a preferred embodiment which is viewed as the best mode envisioned.

Figure 3:
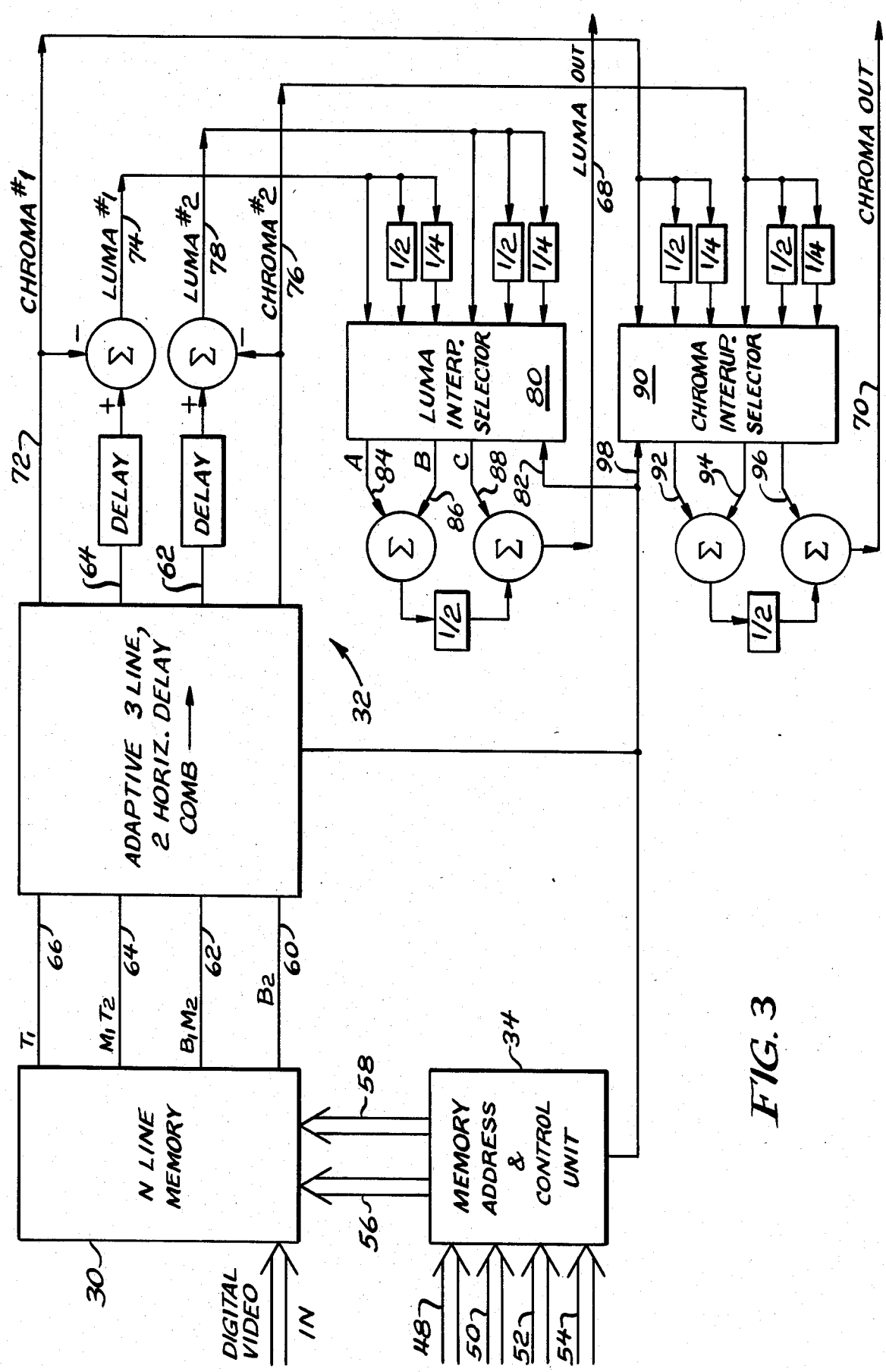
FIG. 3 is a further representational block diagram of a system according to the present invention which illustrates the comb and interpolator arithmetic logic circuitry in greater detail.

Referring now to FIG. 3, therein is shown a more detailed block diagram of a combined adaptive comb filter and interpolator having scan rate conversion according to the present invention. Several elements are illustrated in FIG. 3 which are common to FIG. 2. Specifically, memory 30 and control circuit 34 are illustrated at the left side of FIG. 3. Similarly, logic circuit 32 is illustrated generally with the adaptive comb filtering and interpolating arithmetic logic process partially illustrated in representational block diagram form. Bus 44 from FIG. 2 is illustrated in FIG. 3 as a series of lines 48, 50, 52 and 54 for providing a pixel clock rate, horizontal sync information, vertical sync information, and a mode control signal, respectively, to the control circuit 34. Similarly, bus 40 of FIG. 2 is shown as line 56 for address bussing to memory 30 and line 58 for read and write control of memory 30 by control circuit 34. Bus 38 of FIG. 2 is illustrated more particularly in FIG. 3 as a series of outputs 60, 62, 64 and 66 from memory 30 connected to various points of the combing and interpolating arithmetic circuitry of logic circuit 32.

In operation, logic circuitry 32 receives the scan converted line display information from memory 30 and ultimately produces separated, combed, scan converted and interpolated luma signals on line 68 and separated, combed, scan-converted, and interpolated chroma signals on line 70 for digital to analog conversion and display at the television picture screen. More particularly, logic circuit 32 initially receives a "top" scan converted line on line 66, a "middle" scan converted line on 64 and a "bottom" scan converted line on bus 62. As mentioned above, the adaptive comb circuitry of logic circuit 32 generally combines and averages the first top line from bus 66 and the first bottom line from bus 62 to reduce the comb error percentage and uses an algorithm process in combination with the first middle line from bus 64 to develop a first chroma signal on bus 72. As is well known in the art, this signal is appropriately timed and then subtracted from the original signal present on bus 64 to produce a first luma signal on bus 74.

Similarly, a second pair of chroma signals is developed by logic circuit 32 by taking a signal present on bus 64 and treating it as the second top line for the adaptive comb processing. Correspondingly, the signal on bus 62 becomes the second middle line and the signal present on bus 60 becomes the second bottom line for the adaptive comb filtering. Thus, in a fashion similar to that used for the first set of chroma and luma signals, a second chroma signal is developed on bus 76 and a second luma signal is developed on bus 78. It will be appreciated that in this fashion, two separate chroma and luma signals are developed utilizing a three line delay between the signal on bus 66 and the signal on bus 60.

Figure 7:
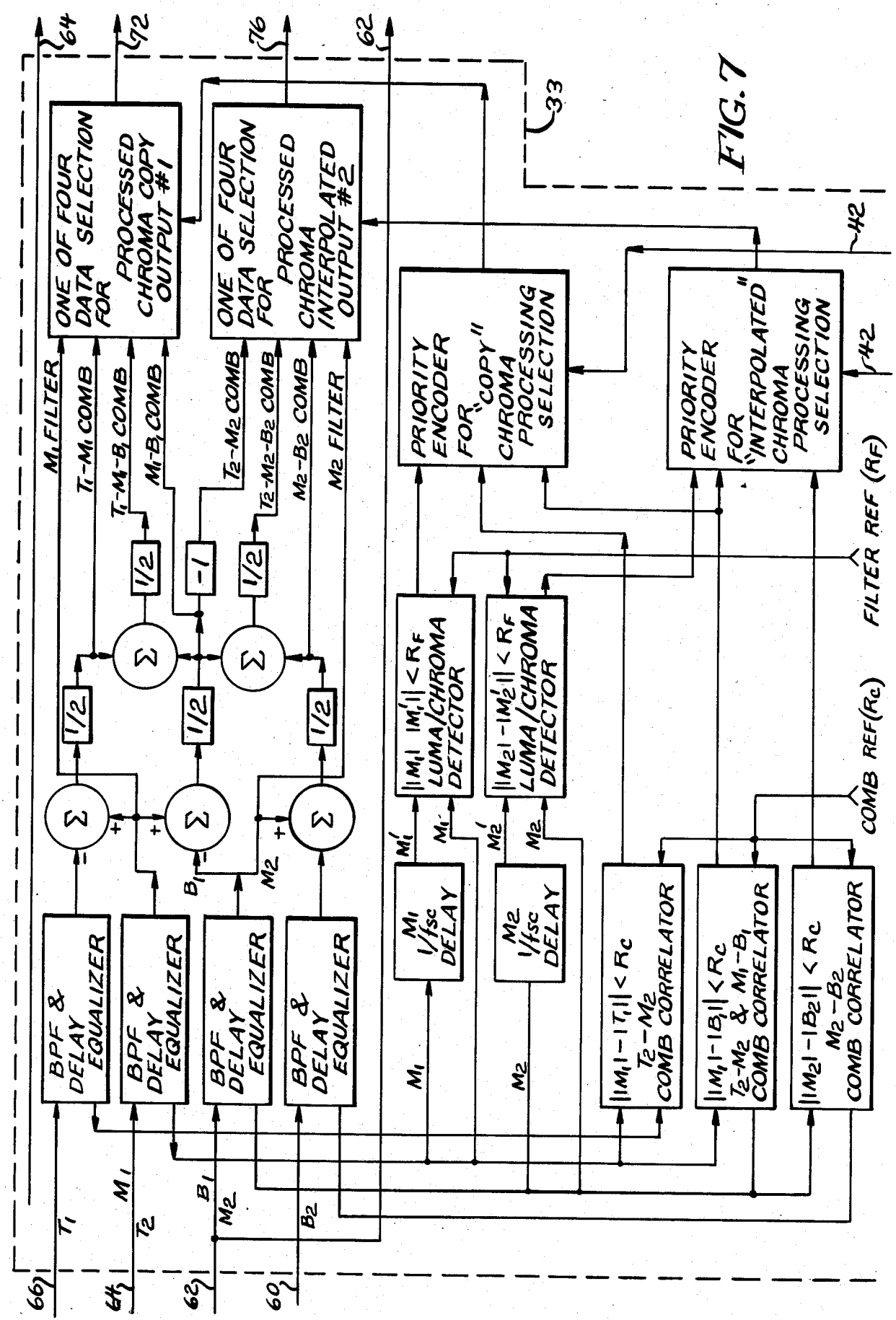
FIG. 7 is an illustration of one embodiment of an adaptive comb filter for advantageous use in the system of FIG. 3.

Although one embodiment of logic circuit 32 comprising the adaptive comb filter with its associated algorithmic interpretation circuitry is shown in limited detail in FIG. 3, it will be appreciated by those skilled in the art that other appropriate systems could be substituted. Also, the memory addressing scheme of the present invention allows for the use of only four lines in bus 38 to provide the desired top, middle and bottom line sets to the filter of circuit 32. This represents a savings compared to the six lines typically utilized for adaptive comb filters of this type. Correspondingly, some circuitry within the filter may be combined to more fully take advantage of the savings presented by the present invention. An illustration of a block diagram representation of this feature is provided in FIG. 7.

Once the two separate chroma and luma signals are developed on lines 72, 74, 76, and 78, the separate luma and chroma signals are individually interpolated to provide scan converted, interpolated luma on line 68 and scan converted, interpolated chroma on line 70. More particularly, the first luma signal on line 74 and the second luma signal on line 78 are logically processed and then provided as inputs having various weighting factors to a luma interpolator selector 80 which then develops three outputs depending upon the mode information received from control circuit 34 via line 42 at the input 82. These three outputs 84, 86, and 88 are then combined, weighted, averaged and processed to provide the interpolated, scan converted luma output on line 68. In a similar fashion, the first chroma signal on line 72 and the second chroma signal on line 76 are variously weighted and provided as inputs to a chroma interpolator selector 90 which develops three outputs 92, 94 and 96 depending upon the mode information received via line 42 at an input 98 from control circuit 34. The weighted summation of the outputs on lines 92, 94, and 96 is processed as the chroma output on line 70.

Figure 4:
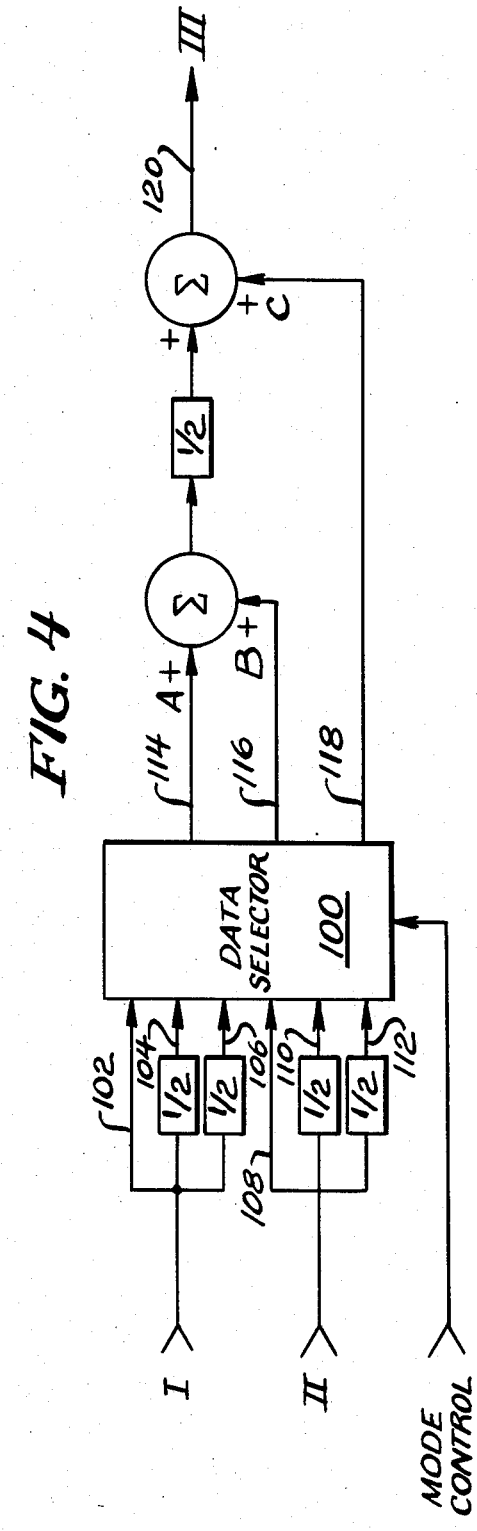
FIG. 4 is a representational block diagram of an interpolator circuit for use in the preferred embodiment.

A basic algorithmic device which is illustrated more specifically in FIG. 4 is used for each of luma interpolator selector 80 and chroma interpolator 90. Generally, inputs I and II thereof represent the first and second chroma signals or the first and second luma signals. A data selector 100 receives these inputs in various weighted forms by inputs 102 through 112. Data selector 100 also receives mode control information via line 42. Depending upon the mode control information received via line 42, data selector 100 produces three outputs A, B, and C on busses 114, 116, and 118, respectively, which represent various weighted values of the information of signals I and II. The operational mode must be selected to match the specific system with which the data selector is used. Only one mode is used with any one system. Accordingly, the particular algorithm applied will depend on the system used with one algorithm being required for a specific system. The outputs A, B, and C for the illustrated embodiment are determined in data selector 100 using the following table.

| Equation for III | Weighting Values | | | Operational Mode |
|---|---|---|---|---|
| | A | B | C | |
| III = I | I | I | 0 | Line Copies or Line Repeats |
| III = .75I + .25II | I | .5I | .25II | 1050 Line Output 4:1 Scan Converter 2:1 Scan Converter with Vert. Mod. |
| III = .5I + .5II | .5I | .5I | .5II | 525 Line, 2:1 Scan Converter or 1050 Line, 2:1 Scan Converter with no Vert. Mod. |

The ultimate signal III, being chroma or luma (depending upon in which circuit the data selector 100 is being utilized) represents the average of signals A and B summed with signal C for the illustrated embodiment. The table above also provides an equation which illustrates the respective weighting for the signals I and II for that embodiment.

Generally speaking, logic circuitry 32 comprises an adaptive comb filter and interpolator which may be constructed using the general guide lines of an adaptive comb filter as is known in the art. Similarly, memory 30 may be a standard RAM having N horizontal lines of storage and may also be constructed utilized CCD logic and shift registers. For producing non-interlaced 525 progressive scan line output signals in a standard NTSC receiver, memory 30 may comprise about 3185 bytes or 3.5 horizontal lines of memory at 910 bytes per line. For producing a progressive scan 1050 line image on the receiver picture tube, memory 30 would comprise about 4.25 lines of memory. It will be appreciated by those familiar with the television art that this represents a substantial savings in memory storage space as required to perform the separate functions of adaptive comb filtering and interpolation with scan line rate conversion.

Figure 5:
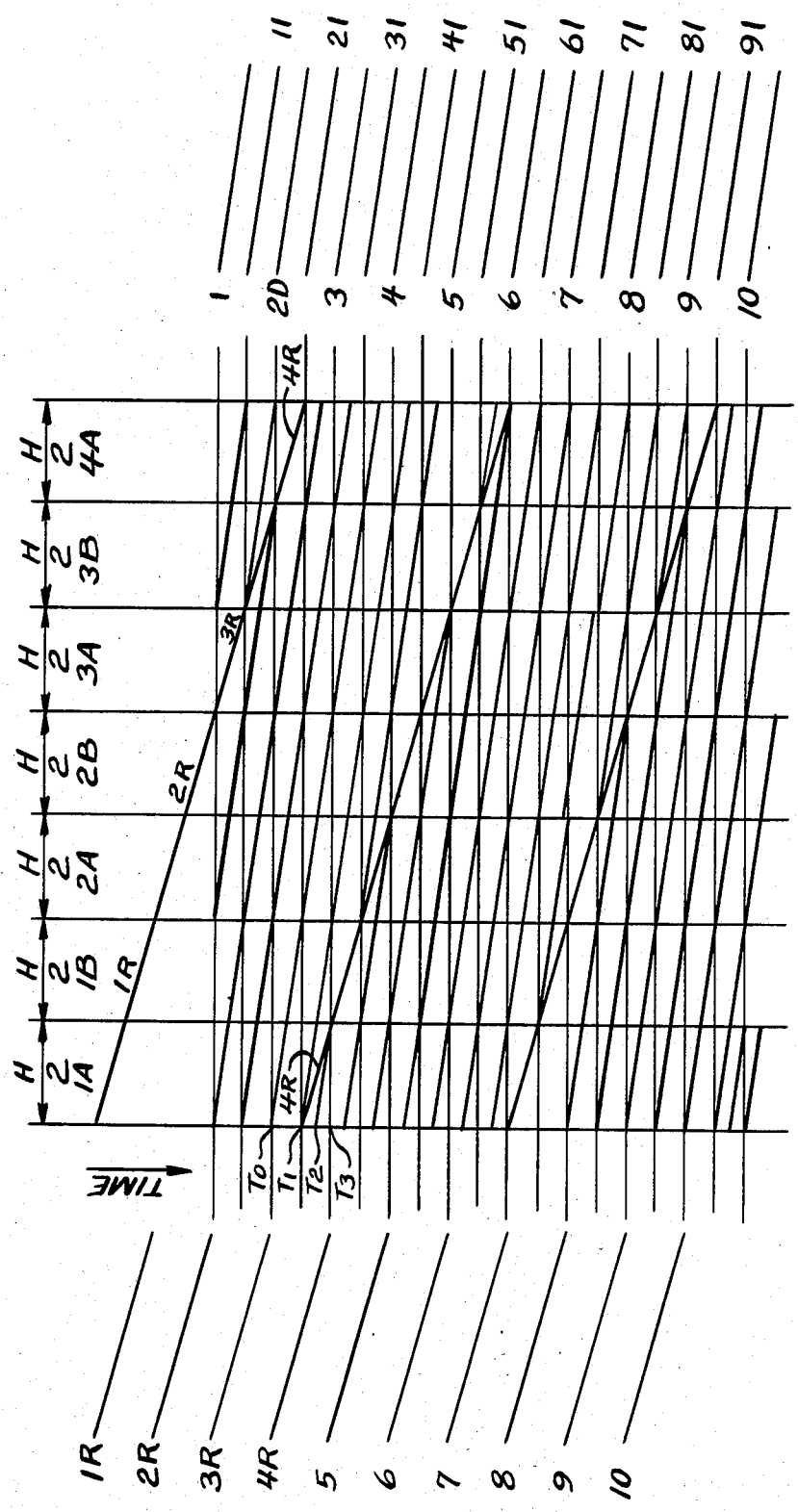
FIG. 5 is an illustrative timing diagram displaying the memory addressing for scan conversion with a three line comb filter as may typically be used with the preferred embodiment of the present invention.

To provide for the reduced memory requirements in the present invention, control circuit 34 generates an address offset between the write and read addresses to control the timing of the writing of information (digitized video signals) received on data bus 36 and the reading out of information on busses 60 through 66. The address sequencing of memory 30 for scan rate conversion for a three line comb filter, such as is illustrated in FIG. 3, may be more fully understood by reference to accompanying FIG. 5. FIG. 5 is an illustrative time-addressing diagram for scan rate conversion from 15 kHz line rate television signal to a 31 kHz line rate television signal for display on the television receiver picture tube. The left hand column represents the input 15 kHz line rate raster display. The right hand column represents the 31 kHz rate output raster display. The center portion represents a map of the actual pixel storage in memory 30. The memory storage space is shown on the horizontal axis and time is illustrated vertically in progression from the top of the diagram. The memory storage space is shown subdivided into ½ horizontal line segments to aid in the identification of the time-address sequencing generated by control circuit 34 for the writing and reading of information to memory 30.

In the operation of a combined three line comb filter and a 2:1 scan rate converter and interpolator, control circuit 34 creates a two, 15 kHz-horizontal-line delay between the received 15 kHz line rate video information written to memory 30 and the 31 kHz line rate video information read from memory 30. This delay, together with the 3½ horizontal line memory storage provides the "top" line, "middle" line, and "bottom" line scan rate converted information on data busses 60 through 66 for the three-line comb processor and interpolator.

Figure 6:
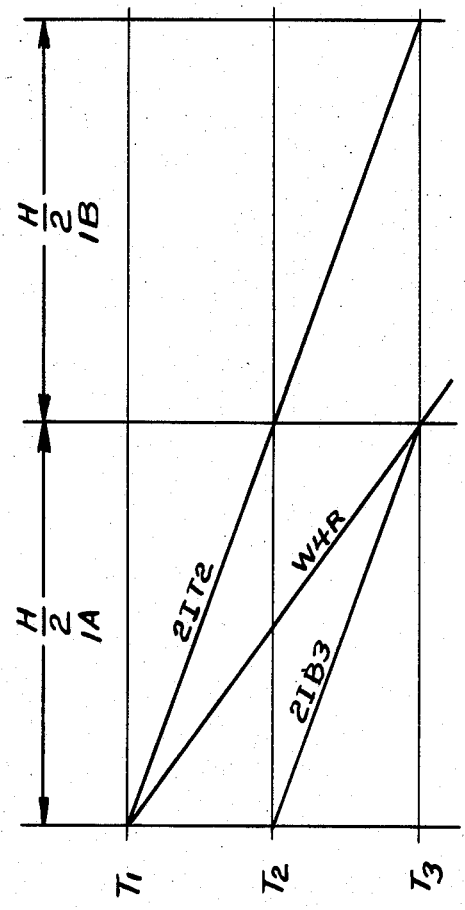
FIG. 6 is an enlarged view of one portion of the memory addressing diagram of FIG. 5.

One portion of FIG. 5 illustrates the memory write and read address sequence created by control circuit 34 for the time interval T0 to T3. At time T0, the video data input to memory 30 on bus 36 comprises the received, digitalized 15 kHz line rate information for display line 4R; memory 30 contains previously stored information comprising received 15 kHz rate lines 1R, 2R and 3R at address locations 1A through 1B, 2A through 2B, and 3A through 3B, respectively. Also at this time, the three-line comb filter and interpolator accept data to process and display the replica of received line 2R on the 31 kHz raster at line 2D. During the time interval T0 to T1, control circuit 34 generates the write 3R from the memory 30 segments 1A through 1B, 2A through 2B, and 3A through 3B, respectively, placing the appropriate scan rate converted video data as "top", "middle", and "bottom" lines on busses 60 through 66 for the comb processing described earlier. An expanded illustration of the first line of memory storage is shown with more detail in FIG. 6. FIG. 6 should be viewed in conjunction with FIG. 5 throughout the following discussion. In a fashion similar to that described above for lines 1R, 2R and 3R, and during the time interval T1 to T3, control circuit 34 generates the write addresses which store the pixels comprising the last half of the received 15 kHz rate line, 4R, at consecutive memory locations in the memory 30 segment 1A and also generates the addresses to simultaneously read the complete line data comprising the received lines 1R, 2R, 3R, and 4R from the memory 30 segments 1A through 1B, 2A through 2B, 3A through 3B, 4A, and 1A again, respectively, to present the appropriate scan rate converted video "top", "middle" and "bottom" lines on busses 60 through 66 for the comb filter and interpolation processing and subsequent display of interstitial line 2I on the 31 kHz line rate raster.

Memory 30 will be of minimum size when control circuit 34 generates a read operation of memory segment 1A (to place data from received line 1R on bus 66), a write operation on memory segment 1A (to store data for the last half of received line 4R in memory 30) and another read operation of memory segment 1A (to place data from received line 4R on bus 60). Three critical read-write-read operations occur in memory 30 segment 1A at times T1, T2, and T3 as illustrated in FIG. 6. At time T1, a read-write operation is necessary to prevent the loss of the first pixel data for line 1R prior to storing data for the first pixel in the last half of line 4R at that same memory address. At time T2, a read-write-read operation is required to provide the simultaneous output of the last pixel in the first half of line 1R and the first pixel in the last half of line 4R while storing the current input pixel for line 4R. Finally, at time T3, a write-read operation is necessary to store the last pixel in the last half of line 4R in memory 30 and simultaneously place that pixel on output bus 60.

Although the present invention has been described above in terms of a preferred embodiment, the exact scope of the present invention is believed to be defined in the appended claims and such modifications and alterations as would be apparent to one skilled in the art and familiar with the teachings of this application are deemed to be within the spirit and scope of the present invention. The present invention is directed toward providing combined adaptive comb filtering and interpolation with scan rate conversion using a minimum amount of memory. In some applications, use of the described preferred embodiment may not be desirable. For example, recursive filtering would be undesirable using a system such as that of the preferred embodiment of the present invention because input information received from the broadcast signal is retained no longer than necessary to provide the scan rate conversion and reading out to the adaptive comb and interpolator logic circuitry. Accordingly, additional memory space may be added when additional features are desired.

Nonetheless, the present invention is applicable to a variety of systems for improving the displayed picture at the television receiver. For example, the present invention may be used with a one line comb to provide for combing and interpolating using only one and one half lines of memory storage space. Such an application may be desireable in less expensive receivers in which it would be undesireable to include the adaptive comb filtering feature. Also, adaptation of the present invention may be made by providing another input to the memory 30 and using appropriate addressing from control circuit 34 to operate memory 30 as two separate memories for scan converting separated chroma and luma.

Also, the present invention may be used in full field or frame processing if desired. In such a system, entired fields, or frames would be processed in much the same way as individual lines of particular fields are processed as described above. The utilization of the processing means disclosed herein would allow for a similar savings in memory storage requirements for the expanded processing possibilities of the full frame systems.

In addition, the combined adaptive comb filter and scan rate converter could be used to replace frame separated color with line separated color or to replace frame interpolated video with line interpolated video for adaptive motion compensation as required by frame processors. Similarly, the present invention could be used as a line processor in a motion compensated comb scan converter. These alternative applications gain many of the same advantages as that of the preferred embodiment, namely, the present invention improves the overall picture quality at the user end without using any additional spectrum band width in an already crowded transmission spectrum or additional hardware at the transmission end while minimizing space and cost necessary at the user end to provide the improved picture.

What is claimed is:

1. In a television receiving system for receiving and displaying television video signals formatted for display, a method for providing combined comb filtering and interpolation and scan rate conversion comprising:
receiving television video signals;
storing ones of said television video signals formatted for display at a first rate;
selectively addressing said stored video signals at a second rate greater than said first rate to provide a plurality of progressive video signals for comb filtering;
comb filtering said plurality of progressive video signals to produce separated chroma and luma signals; and
interpolating said chroma and luma signals to produce interstitial video signals for display.

2. The method of claim 1 wherein comb filtering said plurality of progressive video signals comprises adaptive comb filtering said plurality of progressive video signals to produce separated chroma and luma signals in accordance with a predetermined algorithm.

3. The method of claim 2 wherein said plurality of progressive video signals comprises three progressive display lines.

4. The method of claim 3 wherein adaptive comb filtering to produce separate chroma and luma signals further comprises adaptive comb filtering first and second sets of said three progressive display lines to produce first and second chroma signals and separate first and second luma signals.

5. The method of claim 4 wherein said interpolating said chroma and luma signals comprises:
  interpolating said first and second chroma signals according to a preselected algorithm to produce interstitial chroma output signals; and
  interpolating said first and second luma signals according to said preselected algorithm to produce interstitial luma output signals.

6. In a television receiving system for receiving and displaying television video signals formatted for display, a combined comb filter and interpolator with scan rate conversion comprising:
  receiving means for receiving television video signals;
  memory means for storing ones of said television video signals formatted for display at a first rate;
  control means for selectively addressing said stored video signals and outputting said video signals at a second rate greater than said first rate in response to timing information coordinated with said received formatted video signals for processing selected stored video signals to provide a plurality of progressive video signals for comb filtering and interstitial video signal generating;
  comb filter means for receiving said plurality of progressive video signals for comb filtering said plurality of progressive video signals to produce separated chroma and luma signals; and
  interpolator means for interpolating said chroma and luma signals to produce interstitial video signals for display.

7. The apparatus of claim 6 wherein said comb filtering means comprises adaptive comb filtering means for producing separated chroma and luma signals in accordance with a predetermined algorithm.

8. The apparatus of claim 7 wherein said adaptive comb filtering means receives a plurality of progressive video signals in which said plurality comprises three progressive display lines.

9. The apparatus of claim 8 wherein said adaptive comb filtering means receives first and second sets of said three progressive display lines to produce first and second chroma signals and separate first and second luma signals.

10. The apparatus of claim 9 wherein said interpolating means for interpolating said chroma and luma signals comprises:
  first interpolating means for interpolating said first and second chroma signals according to a preselected algorithm to produce an interstitial chroma output signal; and
  second interpolating means for interpolating said first and second luma signals according to said preselected algorithm to produce an interstitial luma output signal.

11. In a television receiving system for receiving and displaying television signals having defined display lines, a combined adaptive comb filter and interpolator having scan rate conversion comprising:
  memory means for storing a predetermined count of received digitalized display lines;
  control means coupled to said memory means for selectively addressing said memory means to store received digitalized lines at a first rate and to progressively output stored received display lines at a second rate greater than said first rate; and
  logic circuitry means coupled to said control means and said memory means for adaptive comb filtering and interpolating said received digitized display lines to produce separated chroma and luma signals and interstitial display lines as output signals for display.

12. The combined adaptive comb filter and interpolator having scan rate conversion of claim 11 wherein said logic circuitry means comprises:
  means for adaptive comb filtering of signals received from said memory means according to a predetermined algorithm to produce separate first and second correlated luma signals and separate first and second correlated chroma signals;
  means for interpolating said first and second chroma signals according to a preselected algorithm to produce interpolated and interstitial chroma output signals; and
  means for interpolating said first and second luma signals according to a preselected algorithm to produce interpolated and interstitial luma output signals.

13. The combined adaptive comb filter and interpolator having scan rate conversion of claim 11 wherein said memory means stores a predetermined minimum count of display lines for scan rate conversion.

14. The combined adaptive comb filter and interpolator having scan rate conversion of claim 13 wherein said predtermined minimum count is about 3½ display lines.

15. The combined adaptive comb filter and interpolator having scan rate conversion of claim 13 wherein said first rate is about 15 kHz. and said second rate is about 31 kHz.

16. The combined adaptive comb filter and interpolator having scan rate conversion of claim 15 wherein said received digitalized display lines are interlaced and wherein said chroma and luma output signals are progressive scan.

17. The combined adaptive comb filter and interpolator having scan rate conversion of claim 13 wherein said predetermined minimum count is about 4¼ display lines.

18. The combined adaptive comb filter and interpolator having scan rate conversion of claim 17 wherein said first rate is about 31 kHz. and said second rate is about 63 kHz.

19. The combined adaptive comb filter and interpolator having scan rate conversion of claim 18 wherein said received digitalized display lines are interlaced and wherein said chroma and luma output signals are progressive scan.

* * * * *